(12) United States Patent
Müssig et al.

(10) Patent No.: US 6,511,742 B1
(45) Date of Patent: Jan. 28, 2003

(54) ADHESIVE TAPE

(75) Inventors: Bernhard Müssig, Seevetal (DE); Gert Schmeer, Bergen-Bernhaupten (DE)

(73) Assignee: tesa AG, Hamburg (DE)

( * ) Notice: Subject to any disclaimer, the term of this patent is extended or adjusted under 35 U.S.C. 154(b) by 53 days.

(21) Appl. No.: 09/715,788

(22) Filed: Nov. 17, 2000

(30) Foreign Application Priority Data

Nov. 19, 1999 (DE) .......................................... 199 55 610

(51) Int. Cl.[7] ................ C09J 7/02; B32B 7/12
(52) U.S. Cl. ................ 428/343; 428/354; 428/910; 156/244.11; 156/244.25; 264/171.11; 264/177.1
(58) Field of Search ................ 428/343, 354, 428/910; 264/171, 177.1, 171.11; 156/244.11, 244.12, 244.15, 244.25

(56) References Cited

U.S. PATENT DOCUMENTS

| 4,454,192 A | * | 6/1984 | Suzuki ................ 428/294 |
|---|---|---|---|
| 4,536,362 A | * | 8/1985 | Donaldson ................ 264/171 |
| 4,592,938 A | * | 6/1986 | Benoit ................ 428/35 |
| 5,079,066 A | * | 1/1992 | Leseman ................ 428/167 |
| 5,093,187 A | * | 3/1992 | Engelmann et al. ........ 428/212 |
| 5,145,544 A | * | 9/1992 | Leseman et al. ............ 156/229 |
| 5,173,141 A | * | 12/1992 | Leseman et al. ....... 156/244.15 |
| 5,435,963 A |   | 7/1995 | Rackovan et al. |

FOREIGN PATENT DOCUMENTS

| DE | 3640 861 A1 | * | 6/1988 |
| EP | 0343 896 A2 | * | 11/1989 |
| EP | 0 411 820 A1 | * | 2/1991 |

OTHER PUBLICATIONS

Pat Abst of EP 269967A C equivalent of DE 3640861 A1), Dec. 1993.*

* cited by examiner

Primary Examiner—Daniel Zirker
(74) Attorney, Agent, or Firm—Norris McLaughlin & Marcus

(57) ABSTRACT

An adhesive tape which comprises: (1) a backing film, wherein the backing film has at least two intermeshed coextruded layers of different composition, whose interface has a nonlinear course in cross section, which continues laminarly in the machine direction and has been oriented in the machine direction, and has plane-parallel outer faces; and (2) at least one adhesive layer which is attached to the backing film.

25 Claims, 5 Drawing Sheets

ADHESIVE TAPE

The invention relates to a film oriented in the machine direction, having plane-parallel outer faces and at least two coextruded layers of different composition whose interface is not planar but instead has a nonlinear course in cross section, which continues laminarly in the machine direction, and to a process, by coextrusion and orientation, for its preparation, and to an adhesive tape produced therefrom.

The particular internal structure of the film derives from the fact that the thickness of one layer varies periodically or irregularly in the cross-direction and the second layer compensates the fluctuations in thickness such that the overall thickness is essentially constant.

The essential technical characteristic of the invention is the combination of lateral tear resistance (tear propagation force and residual strength) and longitudinal strength (tensile strength and stress at 10% elongation) in the machine direction.

PRIOR ART

Films possessing high longitudinal strength are normally obtained by orienting melt-extruded partially crystalline thermoplastics such as polypropylene or polyester. The orientation in question is predominantly biaxial orientation; in exceptional cases, the films are oriented in the machine direction only for the purpose of further increasing the longitudinal strength. The reduced extensibility on tensile stress and improved strength brought about by the orientation have the simultaneous effect, however, of a drastically reduced tear propagation force and residual strength. This leads to tearing and tensile load in the case, for example, of rough edges of film and, respectively, adhesive tape (caused by blunt blades during cutting or subsequent unintended damage to the cut edge). For simple applications, it is sufficient to use rigid PVC films (EPVC and impact-modified SPVC), which offer a compromise between lateral tear resistance and longitudinal strength. The use of woven fabrics offers a comprise at a higher level, albeit with the disadvantages of a very much higher price and further operations such as coating in order to seal the surface.

DE-A 36 40 861 describes a tear-open strip whose tendency to tear off is reduced through the use of a film, oriented in the machine direction, which is produced by coextruding raw materials differing in toughness. The tough and soft coextrusion layer reduces the formation of microcracks when the product is cut and so enhances the lateral tear resistance. However, it does not prevent tearing at edges damaged subsequently; this necessitates a drastic improvement in the tear propagation resistance, possessed only by the coextruded film of the invention with an internal structure. The raw materials specified for the abovementioned invention, for increasing the toughness, however, lead to markedly reduced longitudinal strength, especially the raw materials of the tough coextrusion layer. The films described have a reduced force per 4 mm width even at 10% elongation, and on fracture; if the cross sectionally related values of tensile strength, tear strength and stress at 10% elongation are considered, then the drop in performance becomes even more marked.

Under high load, films and, respectively, adhesive tapes must be reinforced with filaments or with networks of filaments of glass or plastic. In terms of equipment, the production of such filament adhesive tapes is very complex and thus expensive, and susceptible to faults. In addition to the base film, there is an additional requirement for the filaments and laminating adhesive (or additional pressure-sensitive adhesive coating), which makes the products more expensive and ties up a greater quantity of raw material resources. Further disadvantages of such filament adhesive tapes are the low crease fracture stability, the unclean cut edges, and the absence of weldability and recyclability. The preparation is described, for example, in U.S. Pat. No. 4,454,192.

U.S. Pat. No. 4,536,362 describes a method of producing stretch films for pallet wrapping. The ribs which extend in the machine direction are intended to accommodate impurities in the polymer, in order to prevent the formation of holes and other defects in the thin film. The films are unoriented and offer no reinforcing effect.

U.S. Pat. No. 4,592,938 describes a method for producing films for plastic bags, handles, and stretch packaging. A reinforcing effect is obtained in the interior of the film by virtue of coextruded filament like strips extending in the machine direction. The method is not applicable to polypropylene, since the customary gel fraction automatically blocks the filament channels of the die. The films are unoriented and therefore of only low longitudinal strength.

EP 0 411 830, EP 0 343 896, U.S. Pat. Nos. 5,145,544 and 5,173,141 describe an adhesive tape comprising monoaxially oriented film having a rib structure for reinforcement, some of the ribs projecting from the surface and some being embedded in the film surface, with notch-like joints being formed between film and ribs. The invention achieves high lateral tear strength, although the tensile strength and extensibility are still needy of improvement. The essential defect of this invention, however, is that it cannot be produced on an industrial scale. The reason for this is the poor orientability in the standard width. When producing a primary film having a structured (rib) surface in a width of 25 cm, the orientation produces on both sides an indentation which, taking into account the industrially required edge trimming, gives a maximum useful width of approximately 15 cm, which is no longer reasonable commercially for coating with adhesive composition. Despite the high edge trim, which is already unacceptable for economic reasons, the film still has an extremely poor flatness, so that its ability to be coated with pressure-sensitive adhesive is no longer ensured. At relatively large widths, moreover, the flatness is further impaired as a result of nonuniform and inadequate adhesion (owing to the non-plane-parallel outer faces of the film) to the stretching rolls in the subsequent orienting process. When the primary film is oriented longitudinally, the film contracts sharply in the edge region, with the rib structure being essentially retained. In the case of production in standard industrial width, the film is held in the middle region on the stretching rolls, in the cross-direction, as a result of which the rib structure alters because of orientation and the entire quality of the product becomes nonhomogeneous. A further disadvantage is the need for at least 50% embedding of the ribs by means of a calender, which is a very expensive capital item and makes the process much more complex. Comparative Examples I and II of EP 0 411 820 show that excessive impression impairs the cross-direction properties of the film. The rib structure on the surface also readily gives rise to coating errors during the application of release agents or primers in the course of subsequent processing to give adhesive tapes, since the application techniques for films require a smooth surface.

A further disadvantage of films having reinforcing strips or rib structures in or on the surface is in relation to printing, which requires planar surfaces. Especially when the film of the invention is used for an adhesive packaging tape, printability is an important criterion for the customer. The disadvantages of the prior art technical solutions have been overcome by the invention described below.

The invention relates to a film oriented in the machine direction, having plane-parallel outer faces and at least two coextruded layers of different composition whose interface is not planar but instead has a nonlinear course in cross section, which continues laminarly in the machine direction, and to a process, by coextrusion and orientation, for its preparation, and to an adhesive tape produced therefrom.

The essential technical feature of the invention is a combination of lateral tear resistance (tear propagation force and residual strength) and longitudinal strength (tensile strength and strength at 10% elongation) in the machine direction. This is achieved by the special internal structure and by the longitudinal orientation of the backing film, without the need for rib like structures for reinforcement on the surface or embedded in it. As remarked above, structures of this kind would be problematic in processing terms. Examples of film structures of the invention are shown in FIG. 1 (depicted in the cross section of the film.

In its preferred embodiment, the film and, respectively, adhesive tape of the invention in the machine direction has a residual strength of at least 50 N (preferably at least 100 N), a tensile strength of at least 200 N/mm$^2$ or a stress at 10% elongation of at least 100 N/mm$^2$; the cross-direction tensile impact strength is preferably at least 50 mJ/mm$^2$, with particular preference at least 100 mJ/mm$^2$.

The particular internal structure of the film is based on the fact that the thickness of one layer varies periodically or irregularly in the cross-direction and the second layer compensates the fluctuations in thickness such that the overall thickness is essentially constant. Advantageously, the difference in thickness within a layer is more than 10%, in particular more than 20%. In comparison to plane-parallel interfaces, as occur in the customary coextruded films, the interface is enlarged, so that one can refer to intermeshing. This concept of intermeshing becomes particularly illustrative on viewing the cross section of the film in the cross-direction, looking at the preferred embodiment wherein there is a periodic repetition of the pattern in the cross section. The number of thickness maxima and, respectively, minima in the cross-direction within a layer of two intermeshed layers of the backing film is preferably at least 3 per cm width. The composition that is used for the two layers at the interface ought to have different mechanical properties. It is particularly advantageous if the raw materials, or mixtures of raw materials, differ markedly in toughness. Preference is given to those layer compositions which when the layers are compared in the oriented state differ by a factor of at least two in the cross-direction tensile impact strengths. In one of the particularly preferred embodiments, one of the intermeshed layers contains more polystyrene than polypropylene and the other intermeshed layer contains more polypropylene than polystyrene.

The number of intermeshed interfaces may be one or more.

It is favorable to use, in addition to the intermeshed layers, at least one further layer, in order to extend the properties, as is the case with standard coextruded films, with the consequence that the film may consist, for example, of three layers, which in this case would consist of two or three raw materials or raw material mixtures. Interfaces in the film which are essentially smooth are formed by layers of raw materials or raw material mixtures which may be either identical or different. Particularly suitable films are those which are composed of three layers and wherein the middle layer has a lower cross-direction tensile impact strength than the outer layers.

Layers which have intermeshing on the inside and on the other side form an outer face of the film are essentially smooth on the outside, as is the case with normal coextruded films (where the interface is not intermeshed but instead is essentially smooth). This means that the films of the invention have essentially plane-parallel outsides like standard commercial films; in other words, the structure of the intermeshing is generated only in the interior of the film and any effect on the outside is avoided as far as possible. By this means, the problems described in connection with orientation and coating of nonplanar films, as occur with the realization of the embodiment of EP 0 411 820 and equivalent patents, are prevented. The technical effect of this configuration is based on redirecting a critical tear, beginning in the cross-direction, into the harmless machine direction, in which case the tearing of the adhesive tape is suppressed. The effect is achieved by virtue of the ribs with the notch-like separating joint. When an attempt is made to tear the film of the invention, a lateral tear is likewise redirected into the machine direction. Since in the configuration of the invention there is no notched joint, the effect must be based on a different principle. The effect is especially pronounced if, as remarked above, the compositions of the intermeshed layers have markedly different toughnesses. From this it may be concluded that the reason is that the tear extends more readily in the machine direction, along a line with the thinnest tougher layer (the thickest more brittle layer) than in the cross-direction through a line with the thickest tougher layer.

An essential feature in addition to the abovementioned special internal structure and the use of material of different properties on both sides of the intermeshed interface of the film of the invention is the orientation in machine direction following coextrusion. The orientation (also called drawing) can be carried out on standard commercial equipment, as used, for example, in the first operation of the orientation of biaxially oriented films. For the properties of the film it is advantageous to conduct the process such that the film decreases essentially in the thickness and only slightly. In the course of this process, the film lengthens by a factor known as the draw ratio. The draw ratio is preferably from 1:5 to 1:10, with particular preference from 1:6.5 to 1:7.5. The thickness of the film is between 40 and 150 µm, preferably between 50 and 90 µm.

Suitable raw materials for the film of the invention are the standard commercial thermoplastics. Particularly suitable raw materials are polymers of monomers containing an α-olefinic double bond, especially those of monomers such as butylene, propylene, ethylene, vinyl acetate, acrylonitrile or styrene. Acrylic acid and its compounds are also included. The raw materials may be homopolymers, copolymers or terpolymers. The distribution of the monomers in the polymers may be random (random polymer) or ordered (block copolymer, graft polymer). The tacticity may be, for example, atactic, isotactic or syndiotactic. Polymers of high tacticity, especially high isotacticity, are advantageous at least for one layer. Of the polycondensates, polyesters and polyamides are particularly suitable. The morphology of the raw materials used may be partially crystalline or amorphous.

Preferably, one layer of the intermeshed layers comprises polypropylene. It is particularly appropriate if the polypropylene layer following orientation is tough, e.g., for the use of isotactic polypropylene homopolymer or copolymer blended with tougheners such as elastomer, EPDM or low-density polyethylene or comprising tough PP grades such as block copolymers containing more than 5% ethylene. The other intermeshed layer is, advantageously, less tough, comprising preferably polymer with a high glass transition temperature or an incompatible polymer blend.

The use of polystyrene proves particularly suitable for this purpose, suitable polystyrenes being not only brittle polystyrene homopolymers but also impact-modified polystyrene grades. Appropriate polypropylene and polystyrene polymers are described in Ullmann's Encyclopedia of Industrial Chemistry, 5th edition, VCH, Weinheim 1997.

The melt indices of the raw materials of the layers must be harmonized with one another and must lie within the correct range, preferably from 0.3 to 15 g/10 min and, with particular preference, from 2 to 10 g/10 min.

The polymers may be used alone or in blends with one another. The use of additives such as antioxidants, UV absorbers, antiblocking agents, lubricants, nucleating agents, light stabilizers, fillers, pigments or compatibilizers is advantageous. Additives which influence the toughness may be used in particular. Examples of these are plasticizers (such as mineral oils or soft resins), unsaturated or (partially) hydrogenated resins (for example, those based on natural resins or hydrocarbon resins), thermoplastic elastomers (e.g., block copolymers of styrene/substituted styrene and isoprene/butadiene/EP/EB), LLDPE, and metallocene PE. Further additives are described in Encyclopedia of Polymer Science and Technology (Interscience Publishers, New York).

The films may be provided with surface treatments. These are, for example, for promoting adhesion, corona, flame or plasma treatment or coatings of solutions or dispersions or liquid radiation-curable materials. Further possible coatings are imprints and antiadhesion coatings, e.g., those comprising crosslinked silicones, acrylates (e.g., Primal™ 205), polymers containing vinylidene chloride or vinyl chloride as monomer, or stearyl compounds such as polyvinyl stearyl carbamate or chromium stearate complexes (e.g., Quilon™ C) or reaction products of maleic anhydride copolymers and stearylamine. The films may be modified by laminating or radiation treatment.

For the adhesive tape application, the film is coated on one or both sides with pressure-sensitive adhesive in the form of a solution or dispersion or in 100% form (e.g., melt) or by coextrusion with the film. The adhesive film(s) may be crosslinked by means of heat or high-energy radiation and, if required, may be lined with release film or release paper. Appropriate pressure-sensitive adhesives are described in D. Satas, Handbook of Pressure Sensitive Adhesive Technology (Van Nostrand Reinhold). Particularly suitable pressure-sensitive adhesives are those based on acrylate, natural rubber, thermoplastic styrene block copolymer, or silicone.

In order to optimize the properties, the self-adhesive composition employed may be blended with one or more additives such as tackifiers (resins), plasticizers, fillers, pigments, UV absorbers, light stabilizers, aging inhibitors, crosslinking agents, crosslinking promoters or elastomers.

Suitable elastomers for blending are, for example, EDPM or EPM rubber, polyisobutylene, butyl rubber, ethylene-vinyl acetate, hydrogenated block copolymers of dienes (e.g., by hydrogenation of SBR, cSBR, BAN, NBR, SBS, SIS or IR; such polymers are known, for example, as SEPS and SEBS) or acrylate copolymers such as ACM.

Tackifiers are, for example, hydrocarbon resins (e.g., of unsaturated C5 or C7 monomers), terpene-phenol resins, terpene resins from raw materials such as α- or β-pinene, aromatic resins such as coumarone-indene resins, or resins of styrene or α-methyl styrene, such as rosin and its derivatives such as disproportionated, dimerized or esterified resins, it being possible to use glycols, glycerol or pentaerythritol and also others, as listed in Ullmanns Enzyklopädie der technischen Chemie, Volume 12, pp. 525–555 (4th ed.), Weinheim. Particularly suitable are aging-stable resins without an olefinic double bond, such as hydrogenated resins, for example.

Examples of suitable fillers and pigments are carbon black, titanium dioxide, calcium carbonate, zinc carbonate, zinc oxide, silicates or silica.

Suitable UV absorbers, light stabilizers and aging inhibitors for the adhesive compositions are the same as those listed later on below for the stabilization of the film.

Examples of suitable plasticizers are aliphatic, cycloaliphatic and aromatic mineral oils, diesters or polyesters of phthalic acid, trimellitic acid or adipic acid, liquid rubbers (e.g., nitrile rubbers or polyisoprene rubbers), liquid polymers of butene and/or isobutene, acrylates, polyvinyl ethers, liquid resins and soft resins based on the raw materials for tackifier resins, wool wax and other waxes, or liquid silicones. Aging-stable plasticizers without an olefinic double bond are particularly suitable.

Examples of crosslinking agents are phenolic resins or halogenated phenolic resins, melamine resins and formaldehyde resins. Examples of suitable crosslinking promoters are maleimides, allyl esters such as triallyl cyanurate, and polyfunctional esters of acrylic and methacrylic acid.

The thickness of coating with adhesive composition is preferably in the range from 18 to 50, in particular from 22 to 29 g/m². The width of the adhesive tape rolls is presently in the range from 2 to 60 mm.

The preferred process for producing the film or the adhesive tape of the invention comprises the following operations:

melting at least two materials of different composition in extruders combining the melt streams in a die which by virtue of its construction leads to a non-planar interface as set forth in claim 1 cooling the melt to a film orienting the film in the machine direction.

Optionally, the film may be provided with adhesive, this being possible by means of coextrusion or conventional coating.

The adhesive tape of the invention is suitable for many applications, especially for packaging applications, for example, for bundling or binding, as transit protection (pallets or doors of domestic appliances), or for the tearing-open of packaging. The disadvantages of filament adhesive tapes, such as low crease fracture resistance, untidy cut edges and lack of weldability, are not possessed by the adhesive tape of the invention.

Test Methods

Thickness: DIN 53370

Ultimate tensile strength/tensile strength: DIN 53455-7-5

Force/stress at 10% elongation: DIN 53455-7-5

Elongation at break: DIN 53455-7-5

Cross-direction tensile impact strength: DIN 53448 (test specimens 15 mm wide, clamped length 30 mm, yoke 15 g, pendulum 1 J)

Tear propagation force: DIN 53363

Residual strength: in analogy to DIN 53455-7-5 with samples 15 mm wide, notched to a level of 5 mm on one side; the measurement relates to the remaining width of 10 mm.

Longitudinal shrinkage: 10 min at 125° C. in a convection oven, test specimens 100 mm long and 15 mm wide.

Melt index: DIN 53735 (230° C., 2.16 N)

Crease fracture resistance: The film or adhesive tape in a width of 15 mm is folded in the machine direction and the crease edge is pressed smooth using a folding stick, after which the fold is pulled open again, a tensile test to DIN 53455-7-5 is conducted, and the percentage decrease in tensile strength as a result of folding is calculated.

Adhesion data: AFERA 4001, corresponding to DIN EN 1939

EXAMPLES

Example 1

Figure 1:
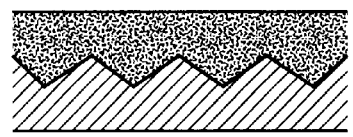
FIG. 1 (with example embodiments 1.1 through 1.25) represents various examples of the special internal structure and longitudinal orientation of the backing film.
Figures 1, 2:
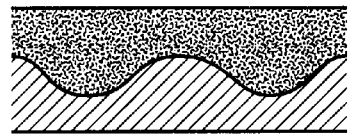
FIG. 2 represents a three-layer internal combining manifold die with exchangeable central plate for generating melt streams with a predetermined profile.
Figures 1, 2, 3:
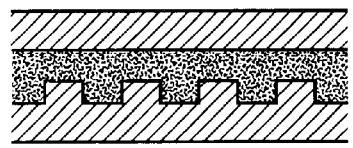
Figures 1, 2, 3, 4:
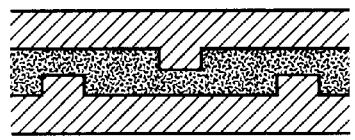
Figures 1, 2, 3, 4, 5:
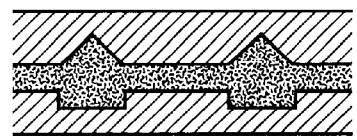
Figures 1, 2, 3, 4, 5, 6:
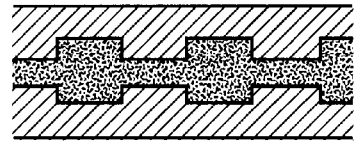
Figures 1, 2, 3, 4, 5, 6, 7:
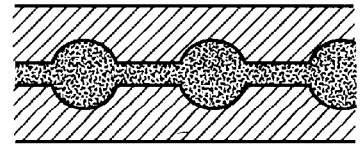
Figures 1, 2, 3, 4, 5, 6, 7, 8:
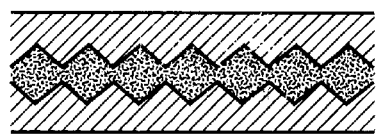
Figures 1, 2, 3, 4, 5, 6, 7, 8, 9:
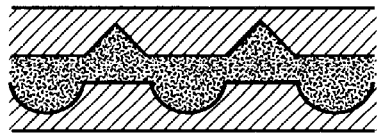
Figures 1, 2, 3, 4, 5, 6, 7, 8, 9, 10:
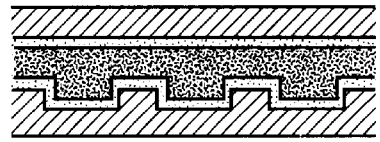
Figures 1, 2, 3, 4, 5, 6, 7, 8, 9, 10, 11:
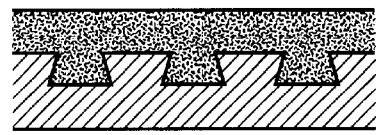
Figures 1, 2, 3, 4, 5, 6, 7, 8, 9, 10, 11, 12:
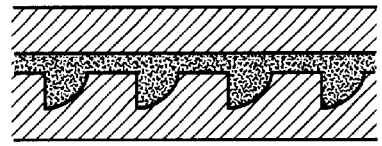
Figures 1, 2, 3, 4, 5, 6, 7, 8, 9, 10, 11, 12, 13:
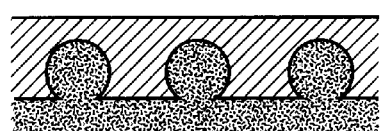
Figures 1, 2, 3, 4, 5, 6, 7, 8, 9, 10, 11, 12, 13, 14:
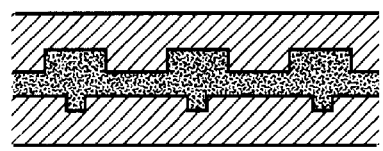
Figures 1, 2, 3, 4, 5, 6, 7, 8, 9, 10, 11, 12, 13, 14, 15:
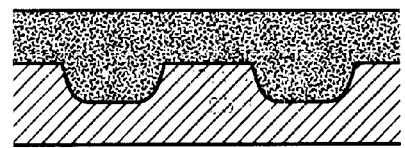
Figures 1, 2, 3, 4, 5, 6, 7, 8, 9, 10, 11, 12, 13, 14, 15, 16:
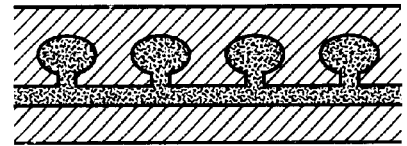
Figures 1, 2, 3, 4, 5, 6, 7, 8, 9, 10, 11, 12, 13, 14, 15, 16, 17:
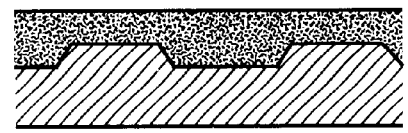
Figures 1, 2, 3, 4, 5, 6, 7, 8, 9, 10, 11, 12, 13, 14, 15, 16, 17, 18:
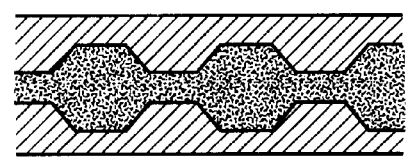
Figures 1, 2, 3, 4, 5, 6, 7, 8, 9, 10, 11, 12, 13, 14, 15, 16, 17, 18, 19:
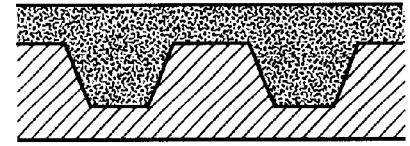
Figures 1, 2, 3, 4, 5, 6, 7, 8, 9, 10, 11, 12, 13, 14, 15, 16, 17, 18, 19, 20:
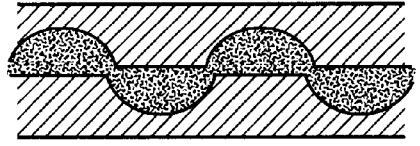
Figures 1, 2, 3, 4, 5, 6, 7, 8, 9, 10, 11, 12, 13, 14, 15, 16, 17, 18, 19, 20, 21:
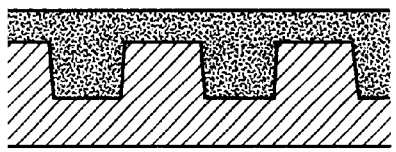
Figures 1, 2, 3, 4, 5, 6, 7, 8, 9, 10, 11, 12, 13, 14, 15, 16, 17, 18, 19, 20, 21, 22:
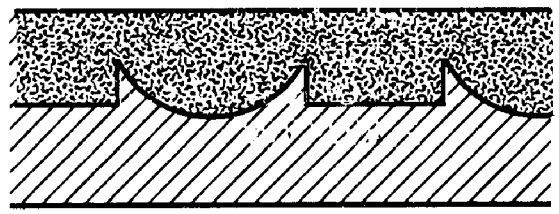
Figures 1, 2, 3, 4, 5, 6, 7, 8, 9, 10, 11, 12, 13, 14, 15, 16, 17, 18, 19, 20, 21, 22, 23:
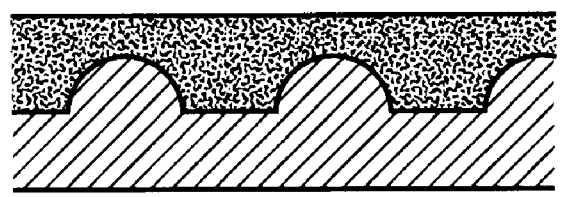
Figures 1, 2, 3, 4, 5, 6, 7, 8, 9, 10, 11, 12, 13, 14, 15, 16, 17, 18, 19, 20, 21, 22, 23, 24:
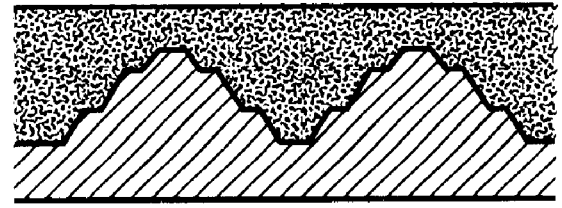
Figures 1, 2, 3, 4, 5, 6, 7, 8, 9, 10, 11, 12, 13, 14, 15, 16, 17, 18, 19, 20, 21, 22, 23, 24, 25:
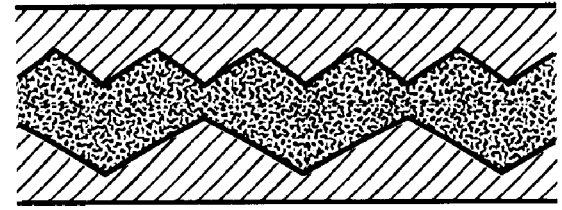
Figure 2:
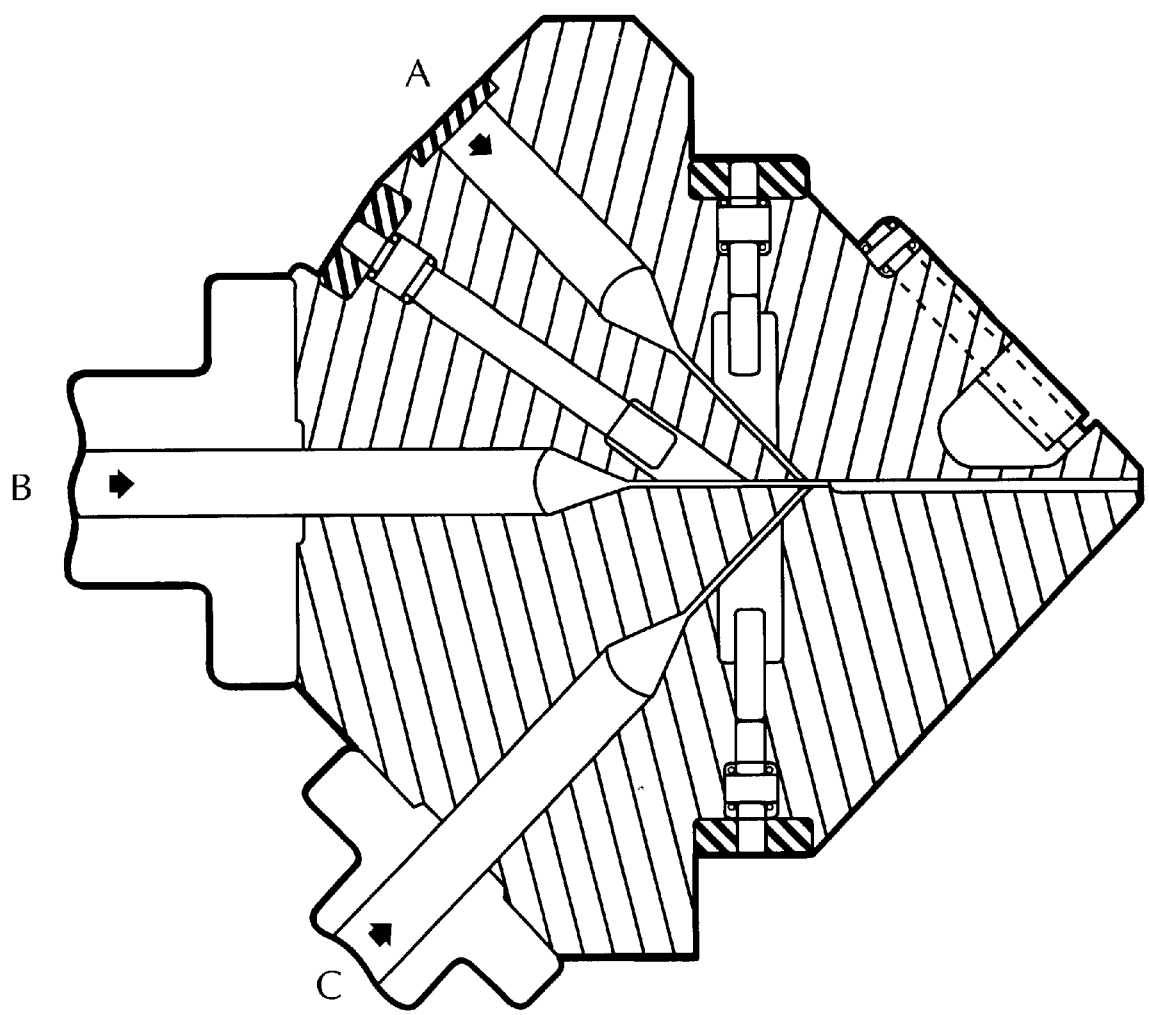

The film is produced on an extrusion unit in a width of 60 cm using a die as shown in FIG. 2 (three-layer internal-combining manifold die with exchangeable central plate for generating melt streams with a predetermined profile), a chill roll and a single-stage short-gap drawing unit. The definition of the layers is as follows: Layer 3 lies on the chill roll, layer 1 is the middle layer, layer 2 lies on the air side. The interface between layers 1 and 3 is smooth and that between layers 2 and 1 is intermeshed. The process conditions are as follows:

|  | Extruder 2<br>Layer 2 | Extruder 1<br>Layer 1 | Extruder 3<br>Layer 3 |
| --- | --- | --- | --- |
| Temperature, initial | 180° C. | 180° C. | 180° C. |
| Temperature, final | 230° C. | 235° C. | 230° C. |
| Screw rotary speed | 20 rpm | 10 rpm | 20 rpm |
| Temperature of composition | 219° C. | 199° C. | 240° C. |
| Pressure of composition upstream of sieve | 89 bar | 86 bar | 89 bar |

Raw materials mixture Extruder 1: 50% Shell Polystyrene N 7000 (homopolymer), 50% Stamylan P 83MF10 Block-Copolymer (trivial name: polypropylene)

Raw materials mixture Extruder 2: 5% Shell Polystyrene N 7000 (homopolymer), 95% Stamylan P 83MF10 Block-Copolymer Raw materials mixture Extruder 3: 75% Stamylan P 83MF10 Block-Copolymer, 25% Stamylex 1026 (LLDPE).

Jaw heating 240° C., chill roll 18° C., film speed prior to drawing 1.5 m/min, after drawing 13.1 m/min, draw ratio 1:8.7. The profile of the central plate produces a repeating rectangular profile between layers 2 and 1; the amplitude of the rectangles is 0.4 mm and the phase spacing is 2 mm.

| Test results: | |
| --- | --- |
| Thickness after drawing | 77 μm |
| Difference in thickness in layer 2 | 10 μm, corresponding to 32% |
| Average thickness of layer 1 | 16 μm |
| Average thickness of layer 2 | 31 μm |
| Average thickness of layer 3 | 30 μm |
| Number of thickness maxima and minima in cross-direction within a layer of two intermeshed layers of the backing film | 5 per cm width |
| Tensile strength, MD | 231 N/mm$^2$ |
| Stress at 10% elongation, MD | 147 N/mm$^2$ |
| Tensile impact strength, CD | 90 mJ/mm$^2$ |
| Residual strength | 120 N |

Three films at 80 μm were produced by processing in each case one raw material composition over all three extruders, under comparable process conditions, and measuring the cross-direction tensile impact strength of the resultant films:

| Mixture as | Tensile impact strength<br>CD,<br>mJ/mm$^2$ |
| --- | --- |
| Layer 1 | <10 |
| Layer 2 | 80 |
| Layer 3 | 250 |

The film is corona-pretreated on both sides, coated on the top face with a 0.5% solution of PVSC in toluene, and dried. The adhesive mixed in the melt from 42% by weigt SIS elastomer, 20% by weigt pentaerythritol ester of hydrogenated rosin, 37% by weight a C5-hydrocarbon resin having an R&B value of 85° C., and 1% by weight antioxidant Irganox™ 1010 (chemical name: Pentaerythritol tetrakis(3-(3,5-di-tert-butyl-4-hydroxyphenyl)propionate)) and applied to the underside of the film at 150° C. using a nozzle. Subsequently, the adhesive tape is wound up to form the stock roll and, for further testing, is cut (razor cutter) to a width of 15 mm. Adhesion data: bond strength to steel 1.6 N/cm, unwind force at 0.3 m/min 0.8 N/cm, unwind force at 30 m/min 0.5 N/cm, application rate 21 g/m$^2$.

Example 2

Equipment as Example 1. Process conditions:

|  | Extruder 2<br>Layer 2 | Extruder 1<br>Layer 1 | Extruder 3<br>Layer 3 |
| --- | --- | --- | --- |
| Temperature, initial | 215° C. | 160° C. | 210° C. |
| Temperature, final | 220° C. | 240° C. | 230° C. |
| Screw rotary speed | 30 rpm | 25 rpm | 0.9 rpm |
| Temperature of composition | 210° C. | 248° C. | 226° C. |
| Pressure of composition upstream of sieve | 121 bar | 125 bar | 70 bar |

Raw materials mixture Extruder 1: 50% Shell Polystyrene S 5400 (high impact), 50% Moplen EPQ 30 RF (copolymer-trivial name: polypropylene)

Raw materials mixture Extruder 2: 10% Shell Polystyrene S 5400 (high impact), 90% Moplen EPQ 30 RF Raw materials mixture Extruder 3: 50% Shell Polystyrene S 5400 (high impact), 50% Moplen EPQ 30 RF.

Jaw heating 240° C., chill roll 18° C., film speed prior to drawing 3.6 m/min, after drawing 24.7 m/min, draw ratio 1:6.7. The profile of the central plate produces a repeating rectangular profile between layers 2 and 1; the amplitude of the rectangles is 0.4 mm and the phase spacing is 2 mm.

| Test results: | |
|---|---|
| Thickness after drawing | 78 μm |
| Difference in thickness in layer 2 | 20 μm, corresponding to 48% |
| Average thickness of layer 1 | 33 μm |
| Average thickness of layer 2 | 43 μm |
| Average thickness of layer 3 | 2 μm |
| Number of thickness maxima and minima in cross-direction within a layer of two intermeshed layers of the backing film | 5 per cm width |
| Tensile strength, MD | 202 N/mm² |
| Stress at 10% elongation, MD | 110 N/mm² |
| Tensile impact strength, CD | 68 mJ/mm² |
| Residual strength | 106 N |

The film is corona-pretreated on both sides, coated on the top face with a solvent-free silicone, which is subsequently crosslinked using electron beams. The underside is provided with a primer comprising natural rubber, cyclo rubber and 4,4'-diisocyanatophenylmethane. The adhesive is dissolved in hexane in a compounder from 40% by weight natural rubber SMRL (Mooney 70), 10% by weight titanium dioxide, 37% by weight a C5-hydrocarbon resin having an R&B value of 95° C., and 1% by weight antioxidant Vulkanox™ BKF (chemical name: 2,2'-methylene-bis-(4-methyl-6-t-butylphenol). The 20% by weight adhesive composition is applied to the primed underside of the film using a coating bar and dried 115° C. Subsequently, the adhesive tape is wound up to form the stock roll and, for further testing, is cut (razor cutter) to a width of 15 mm. Adhesion data: bond strength to steel 2.1 N/cm, unwind force at 0.3 m/min 0.2 N/cm, unwind force at 30 m/min 0.1 N/cm, application rate 23 g/m².

Example 3

Equipment as Example 1. Process conditions:

| | Extruder 2 Layer 2 | Extruder 1 Layer 1 | Extruder 3 Layer 3 |
|---|---|---|---|
| Temperature, initial | 215° C. | 160° C. | 210° C. |
| Temperature, final | 220° C. | 235° C. | 230° C. |
| Screw rotary speed | 30 rpm | 25 rpm | 1 rpm |
| Temperature of composition | 205° C. | 230° C. | 228° C. |
| Pressure of composition upstream of sieve | 120 bar | 100 bar | 90 bar |

Raw materials mixture Extruder 1: 50% Shell Polystyrene S 5400, 50% Moplen EPQ 30 RF Raw materials mixture Extruder 2: 100% Moplen EPO 30 RF Raw materials mixture Extruder 3: 100% Moplen EPQ 30 RF Jaw heating 240° C., chill roll 18° C., film speed prior to drawing 1.5 m/min, after drawing 13.1 m/min, draw ratio 1:8.7. The profile of the central plate produces a repeating profile of semicircles between layers 2 and 1; the radius of the semicirles is 0.2 mm and the phase spacing is 2.4 mm.

| Test results: | |
|---|---|
| Thickness after drawing | 95 μm |
| Difference in thickness in layer 2 | 9 μm, corresponding to 21% |
| Average thickness of layer 1 | 50 μm |
| Average thickness of layer 2 | 42 μm |
| Average thickness of layer 3 | 3 μm |
| Number of thickness maxima and minima in cross-direction within a layer of two intermeshed layers of the backing film | 3.5 per cm width |
| Tensile strength, MD | 211 N/mm² |
| Stress at 10% elongation, MD | 103 N/mm² |
| Tensile impact strength, CD | 70 mJ/mm² |
| Residual strength | 102 N |

The film is corona-pretreated on the underside, coated with an aqueous acrylate pressure-sensitive adhesive (Primal™ PS 83 D) and dried at 115° C. in a drying tunnel. The adhesive tape is subsequently wound up to form the stock roll and for further testing is cut (razor cutter) to a width of 15 mm. Bond strength to steel 3.2 N/cm, unwind force at 30 m/min 3.5 N/cm.

Comparative Example 1

A strapping-grade film was produced from Moplen EPO 30 RF with a draw ratio of 1:8.

| Test results: | |
|---|---|
| Thickness after drawing | 85 μm |
| Tensile strength, MD | 290 N/mm² |
| Stress at 10% elongation, MD | 169 N/mm² |
| Tensile impact strength, CD | 682 mJ/mm² |
| Residual strength | 39 N |

What is claimed is:

1. An adhesive tape which comprises
   (1) a backing film, wherein the backing film
     has at least two intermeshed coextruded layers of different composition, whose interface has a nonlinear course in cross section, which continues laminarly in the machine direction,
     has been oriented in the machine direction, and
     has plane-parallel outer faces
   (2) at least one adhesive layer which is coated on the backing film.

2. The adhesive tape as claimed in claim 1, wherein the backing film in the machine direction has a residual strength of at least 50 N.

3. The adhesive tape as claimed in claim 1, wherein the backing film in the machine direction has a residual strength of at least 100 N.

4. The adhesive tape as claimed in claim 1, wherein the backing film in the machine direction has a tensile strength of at least 200 N/mm².

5. The adhesive tape as claimed in claim 1, wherein the backing film in the machine direction has a stress at 10% elongation of at least 100 N/mm².

6. The adhesive tape as claimed in claim 1, wherein the backing film has a cross-direction tensile impact strength of at least 50 mJ/mm².

7. The adhesive tape as claimed in claim 1, wherein the backing film has a cross-direction tensile impact strength of at least 100 mJ/mm².

8. The adhesive tape as claimed in claim 1, wherein the cross-directional tensile impact strengths of two intermeshed coextruded layers oriented in the machine direction differ by a factor of at least two.

9. The adhesive tape as claimed in claim 1, wherein the difference in thickness within a layer of two intermeshed coextruded layers of the backing film is more than 10%.

10. The adhesive tape as claimed in claim 1, wherein the difference in thickness within a layer of two intermeshed coextruded layers of the backing film is more than 20%.

11. The adhesive tape as claimed in claim 1, wherein the number of thickness maxima and, respectively, minima in the cross-direction within a layer of two intermeshed coextruded layers of the backing film is at least 3 per cm width.

12. The adhesive tape as claimed in claim 1, wherein the number of intermeshed interfaces of the backing film is greater than one.

13. The adhesive tape as claimed in claim 1, wherein the backing film has two intermeshed coextruded layers and one further smooth (non-intermeshed) layer.

14. The adhesive tape as claimed in claim 1, wherein the backing film comprises polymeric raw materials having melt indices of 0.3 to 15 g/10 min.

15. The adhesive tape as claimed in claim 1, wherein the backing film comprises polystyrene in one of the intermeshed layers and polypropylene in the other intermeshed layer.

16. The adhesive tape as claimed in claim 1, wherein the backing film comprises more polystyrene than polypropylene in one of the intermeshed layers and more polypropylene than polystyrene in the other intermeshed layer.

17. The adhesive tape as claimed in claim 1, wherein the thickness of the backing film is from 50 to 90 μm.

18. The adhesive tape as claimed in claim 1, wherein the backing film has been oriented in the machine direction with a draw ratio of from 1:5 to 1:10.

19. The adhesive tape as claimed in claim 1, wherein the backing film has two intermeshed coextruded layers and one further non-intermeshed layer, wherein the outer layers of the backing film are comprised of: (1) one of the two intermeshed coextruded layers and (2) the one further non-intermeshed layer and wherein the middle layer of the backing film is the other intermeshed coextruded layer which is between (1) and (2) and has a lower cross-direction tensile impact strength than the outer layers of the backing film.

20. An adhesive tape of claim 1 wherein the backing film
  has at least two intermeshed coextruded layers of different mechanical property(ies), whose interface has a nonlinear course in cross section, which continues laminarly in the machine direction,
  has been oriented in the machine direction, and
  has plane-parallel outer faces.

21. The adhesive tape of claim 20 wherein the different mechanical property is toughness.

22. The adhesive tape of claim 1 wherein said tape has:
  (a) a residual strength of at least 50 N;
  (b) a tensile strength of at least 200 N/mm$^2$ or a stress at 10% elongation of at least 100 N/mm$^2$; and
  (c) the cross-section tensile impact strength is at least 50 mJ/mm$^2$.

23. The adhesive tape of claim 22 wherein said tape has:
  (a) a residual strength of at least 100 N;
  (b) a tensile strength of at least 200 N/mm$^2$ or a stress at 10% elongation of at least 100 N/mm$^2$; and
  (c) the cross-section tensile impact strength is at least 100 mJ/mm$^2$.

24. The adhesive tape of claim 18 wherein the backing film has been oriented in the machine direction with a draw ratio of from 1:6.5 to 1:7.5.

25. A process for producing an adhesive tape of claim 1, comprising the following operations:
  melting at least two materials of different compositions in extruders
  combining the melt streams in a die which leads to an interface which has a nonlinear course in cross section which continues laminarly in the machine direction
  cooling melt to a film
  orienting the film in the machine direction
  coating at least one adhesive layer on the film.

* * * * *